United States Patent
Balestrini et al.

(10) Patent No.: US 6,250,410 B1
(45) Date of Patent: Jun. 26, 2001

(54) MOTOR VEHICLE WITH A SUPPORTING STRUCTURE OF LIGHT ALLOY

(75) Inventors: Augusto Balestrini; Massimo Di Pardo; Guido Frigo; Luigi Ippolito; Angelo Massone; Gianni Scavino; Giorgio Figura, all of Orbassano (IT)

(73) Assignees: C.R.F. Societa Consortile per Azioni, Turin; Consiglio Nazionale Delle Ricerche, Rome, both of (IT)

( * ) Notice: Subject to any disclaimer, the term of this patent is extended or adjusted under 35 U.S.C. 154(b) by 0 days.

(21) Appl. No.: 08/875,873

(22) PCT Filed: Feb. 27, 1996

(86) PCT No.: PCT/EP96/00796

§ 371 Date: Aug. 5, 1997

§ 102(e) Date: Aug. 5, 1997

(87) PCT Pub. No.: WO96/27518

PCT Pub. Date: Sep. 12, 1996

(30) Foreign Application Priority Data

| Mar. 3, 1995 | (IT) | TO95A0161 |
| Mar. 3, 1995 | (IT) | TO95A0159 |
| Mar. 3, 1995 | (IT) | TO95A0160 |
| Mar. 3, 1995 | (IT) | TO95A0162 |

(51) Int. Cl.⁷ ............................. B62D 21/00; B60K 1/00
(52) U.S. Cl. ..................... 180/65.5; 180/68.5; 180/299; 280/782; 296/901
(58) Field of Search ............................ 280/782; 180/65.6, 180/68.5, 216, 908, 299; 296/205, 208, 146.7, 901, 191, 65.13, 65.14

(56) References Cited

U.S. PATENT DOCUMENTS

| 2,047,336 | 7/1936 | Stout | 180/54 |
| 2,269,451 | 1/1942 | Ford | 296/28 |
| 4,049,309 | 9/1977 | Seal | 296/1 S |
| 4,216,839 | 8/1980 | Gould et al. | 180/65 R |
| 4,217,970 | 8/1980 | Chika | 280/203 |
| 4,438,971 | * 3/1984 | Zaydel et al. | 296/191 |
| 4,453,763 | * 6/1984 | Richards | 296/191 |
| 4,815,785 | * 3/1989 | Goodall et al. | 296/65.13 |
| 4,824,164 | * 4/1989 | Nakayama et al. | 296/146.7 |
| 4,945,682 | * 8/1990 | Altman et al. | 296/146.5 |
| 5,042,864 | * 8/1991 | Mochizuki | 296/65.13 |
| 5,150,944 | * 9/1992 | Yoshida et al. | 296/191 |
| 5,226,696 | * 7/1993 | Klages et al. | 296/203.01 |

FOREIGN PATENT DOCUMENTS

| 4230529 | 3/1934 | (DE) . |
| 2128318 | 12/1972 | (DE) . |
| 146716 A2 | * 7/1985 | (DE) . |
| 4330014 | 3/1995 | (DE) . |
| 913631 | 9/1946 | (FR) . |
| 1046314 | 1/1951 | (FR) . |
| 1202866 | 1/1960 | (FR) . |
| 2698591 | 6/1994 | (FR) . |
| 2702726 | 9/1994 | (FR) . |
| 498671 | 1/1939 | (GB) . |
| 176165 | 10/1984 | (JP) . |

* cited by examiner

Primary Examiner—Frank Vanaman
(74) Attorney, Agent, or Firm—Sughrue, Mion, Zinn, Macpeak & Seas, PLLC

(57) ABSTRACT

A motor-vehicle, particularly an electrically-powered car of small size, has a supporting structure in the form of a reticular framework (2) of light alloy. The framework (2) includes two side structures (3) each formed by extruded profile elements (4) which are welded to joining knot elements (5) which have been obtained by casting. The side structures (3) are connected to each other by cross members (6, 7, 8, 9) which also are formed by extruded profile elements having their ends connected to the side structures (3) by mechanical coupling means, such as screws.

11 Claims, 7 Drawing Sheets

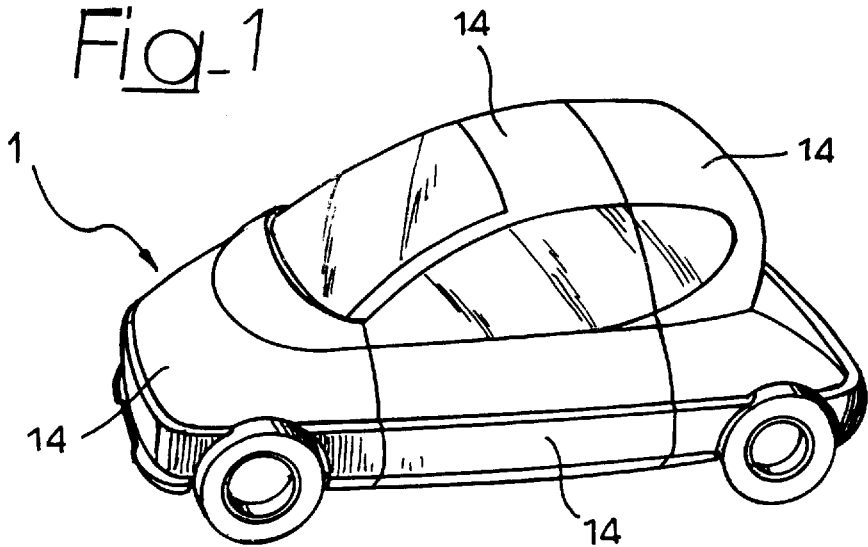
Fig_1
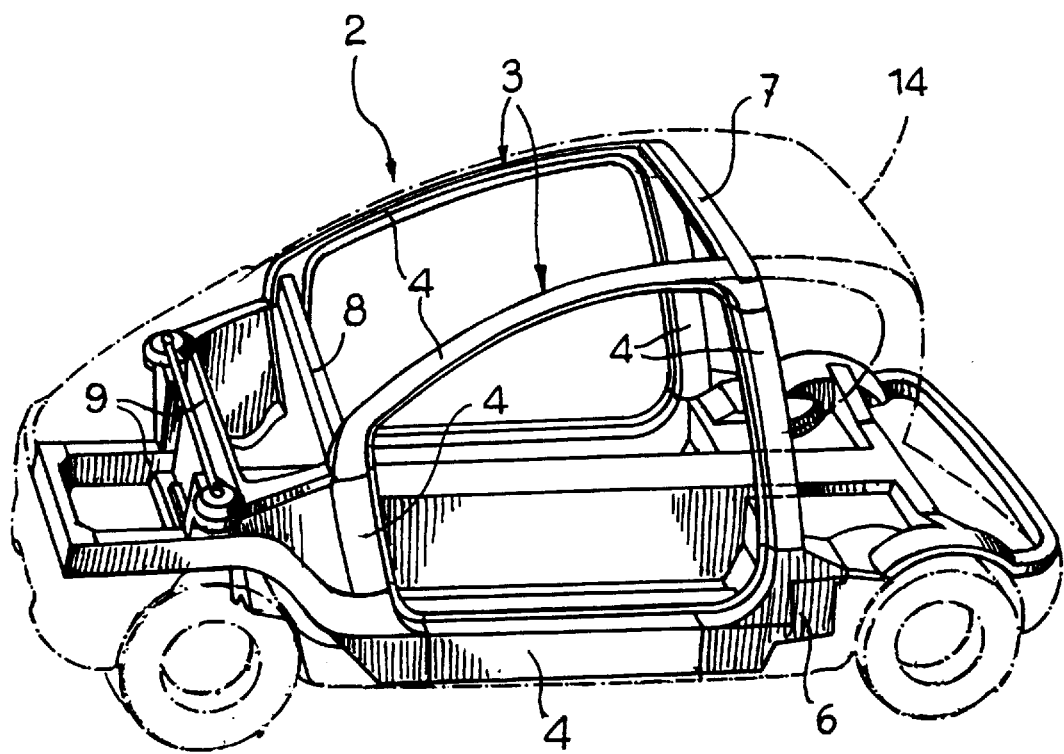
Fig_2

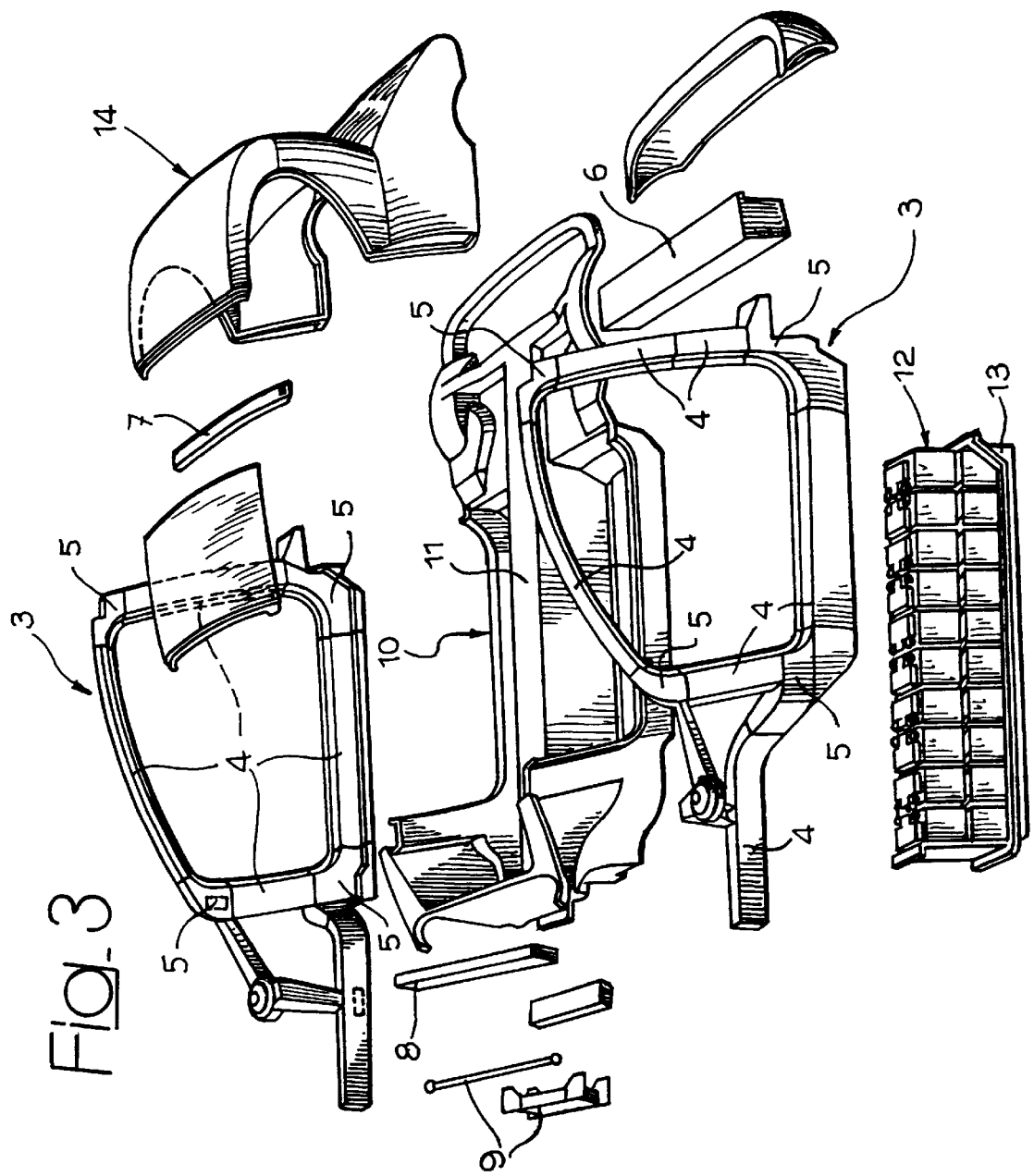

Fig_4
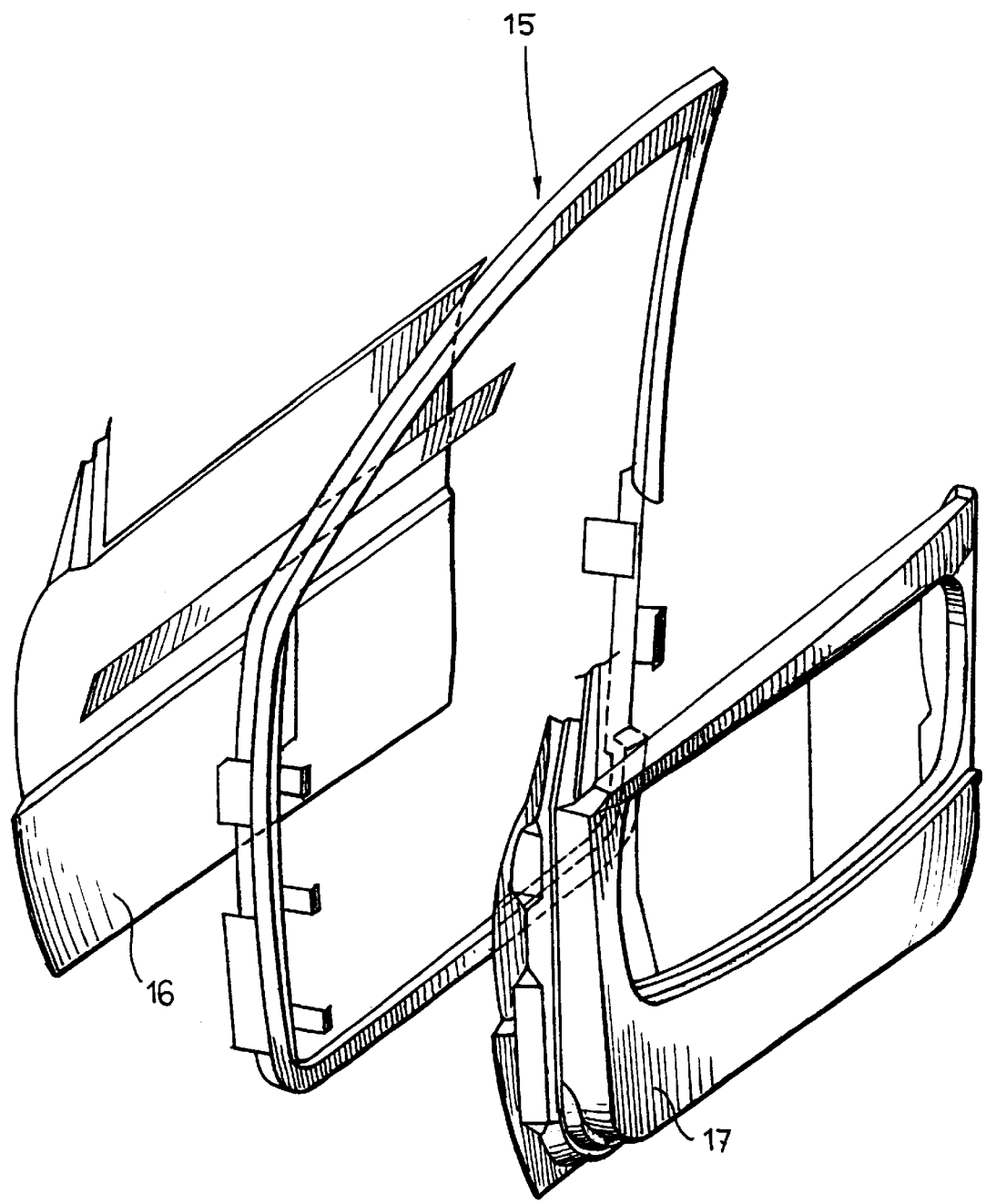

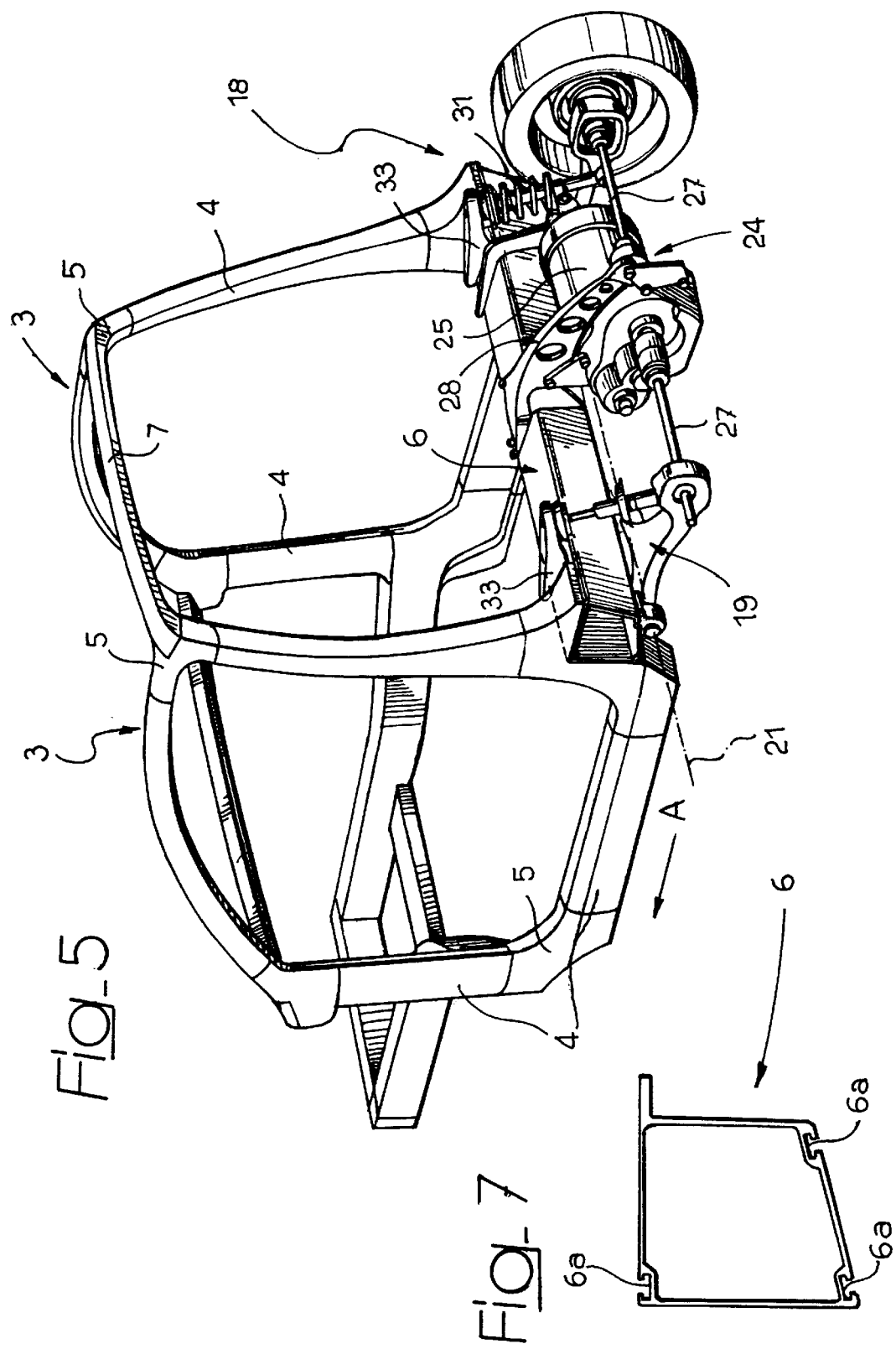

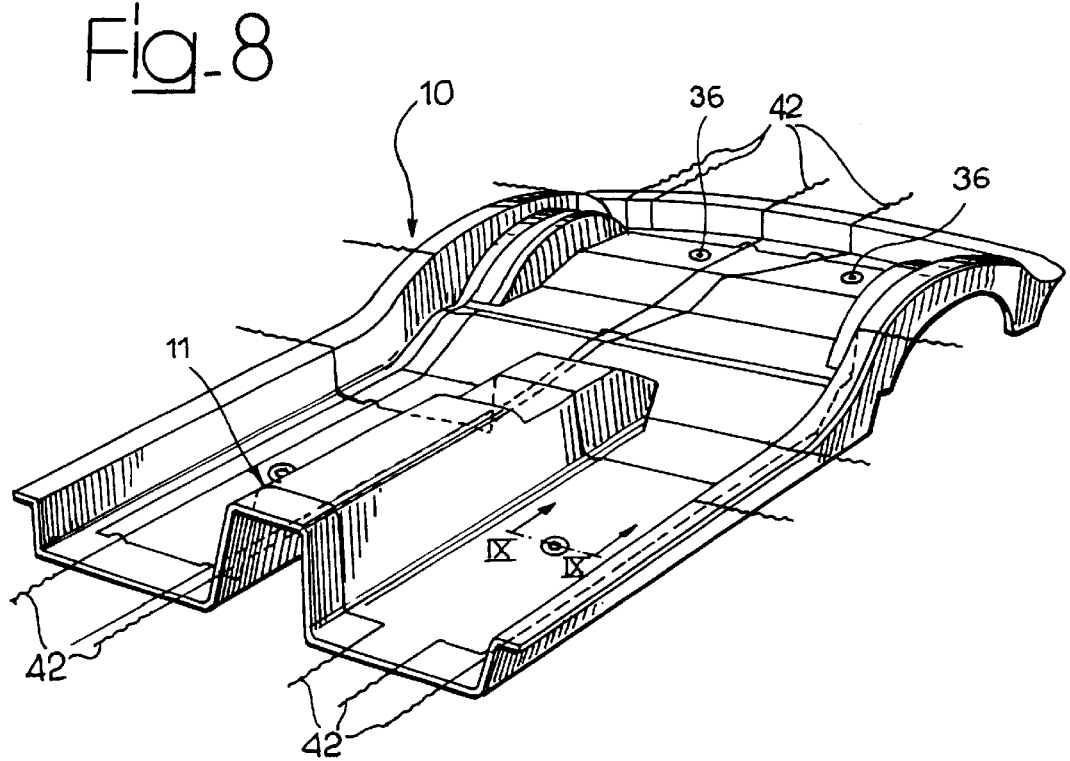
Fig_8
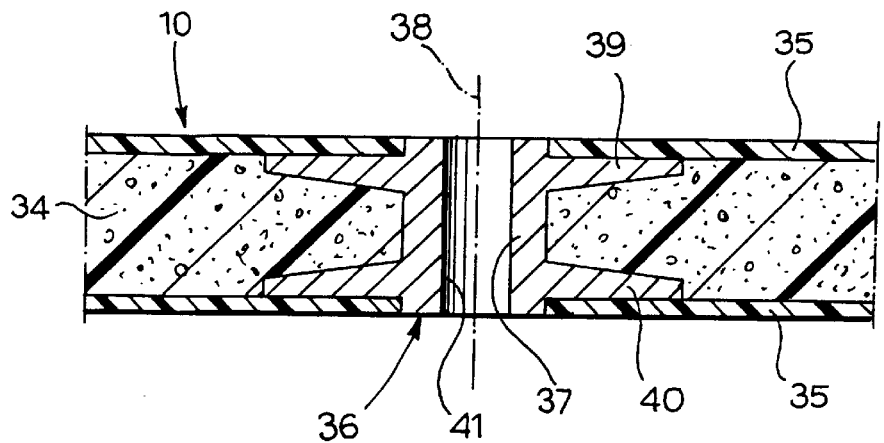
Fig_9

Fig_11
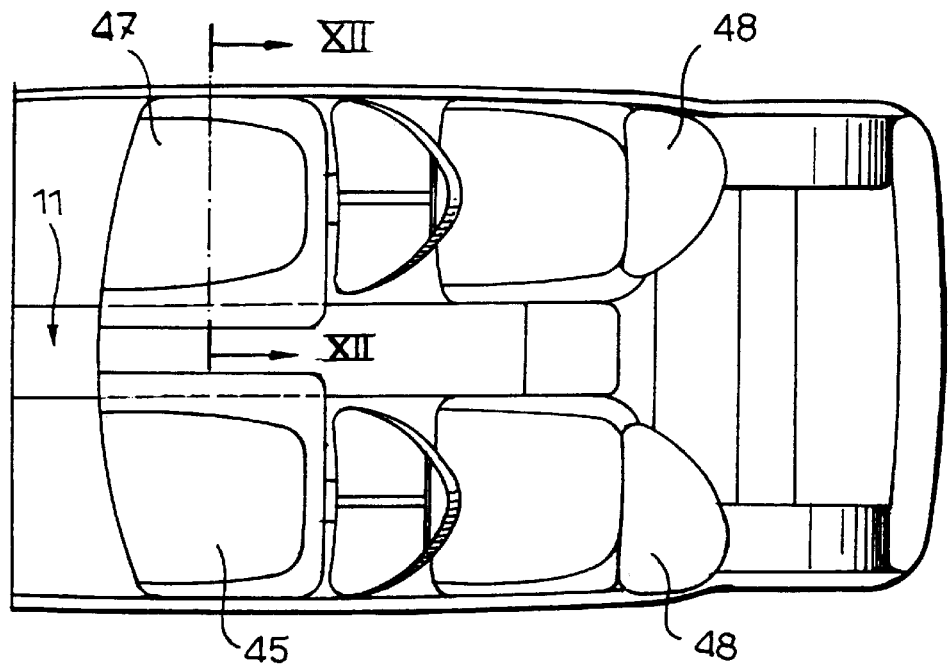
Fig_12
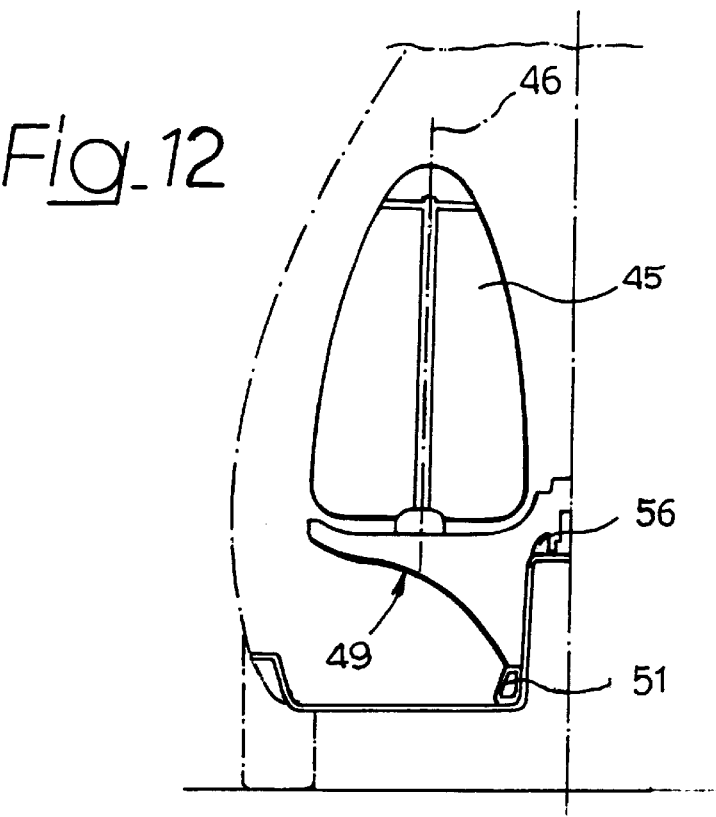

MOTOR VEHICLE WITH A SUPPORTING STRUCTURE OF LIGHT ALLOY

BACKGROUND OF THE INVENTION

The present invention relates to a motor-vehicle of the type comprising:

- a supporting structure formed by a reticular framework of light alloy,
- said reticular framework including two side structures each formed by extruded profile elements welded to joining knot elements which have been obtained by casting,
- said side structures being connected to each other by cross members which are also formed by extruded profile elements having their ends connected to said side structures by mechanical coupling means.

A motor-vehicle of this type is disclosed in European Patent Application EP-A-0 146 716.

SUMMARY OF THE INVENTION

The object of the invention is to provide a new structure for a motor-vehicle of this type which is characterized by a number of relevant advantages, such as a relatively reduced weight, a reduced number of components and an increase of the torsional rigidity of the structure.

A further object of the invention is that of providing a new motor-vehicle structure which can be manufactured with technologies which require low investments, so as to provide an adequate response even to a market of reduced size.

In view of achieving these objects, the invention provides a motor-vehicle of the above indicated type, wherein said motor-vehicle has an electric power unit and said reticular framework is connected to a floor panel of composite plastic material including a longitudinal central tunnel-like portion, said tunnel-shaped housing thereunder electric batteries for supplying the electric power unit of the motor-vehicle, and

- wherein said electric power unit forms part of a preassembled power and suspension unit including:
- a supporting cross member, formed by an extruded metal profile fixed by mechanical coupling means to the supporting structure of the motor-vehicle,
- a pair of longitudinal arms pivotally connected to the cross member around a common axis parallel to the longitudinal direction of said cross member, by supports fixed to the cross member, said arms having free ends on which there are rotatably mounted respective wheel supports,
- a power unit supported in a cantilever fashion by the cross member by a supporting beam fixed to the cross member and including two axles shafts connected to said wheel supports to transfer thereto the torque generated by the power unit, and
- a pair of suspension members comprising a damping cylinder and a helical spring respectively interposed between the two longitudinal arms and two respective supports fixed to the cross member.

Due to the above indicated features, the motor-vehicle according to the invention achieves a number of important advantages. First of all, the structure is comprised of an extremely reduced number of components, which renders the assembling and maintenance operations dramatically simpler and cheaper. Even the weight of the structure is greatly reduced (approximately by 30%) with respect to a conventional structure of a motor-vehicle of the same category, the whole with a relevant increase (approximately by 20%) of the torsional rigidity. The technologies involved for the manufacture require low plant investments, so that the motor-vehicle is particularly suitable even to a production in a relatively reduced quantity. The power and suspension unit can be pre-assembled and then mounted with easy and rapid operations on the supporting structure of the motor-vehicle. This unit can also be dismantled with similarly simple operations in order to allow maintenance and registering operations to be carried out on the suspension and the power unit.

BRIEF DESCRIPTION OF THE DRAWINGS

Further features and advantages of the invention will become apparent from the description which follows with reference to the annexed drawings, given purely by way of non limiting example, in which:

FIG. 1 is a diagrammatic perspective view of a preferred embodiment of the motor-vehicle according to the invention, FIG. 2 is a perspective view at an enlarged scale of the supporting structure of the motor-vehicle of FIG. 1, FIG. 3 is an exploded perspective view of the structure of FIG. 2, FIG. 4 is an exploded perspective view at an enlarged scale of a side door of the motor-vehicle of FIG. 1, FIG. 5 is a perspective view which shows the supporting structure of the motor-vehicle of FIG. 1, with the preassembled power and suspension unit, FIG. 7 is a cross-sectional view of a detail of FIG. 6, FIG. 8 is a perspective view of a preferred embodiment of the floor panel of the motor-vehicle according to the invention, FIG. 9 is a cross-sectional view taken along line IX—IX of FIG. 9, FIG. 11 is a plan diagrammatic view of the passenger compartment of the motor-vehicle of FIG. 1, and FIG. 12 is a cross-sectional view taken along line XII—XII of FIG. 12.

FIG. 1 shows an electrically-powered car of small size, for which the applicants have devised a preferred embodiment of the invention. However, it is clearly apparent that the invention is generally applicable to any type of motor-vehicle structure. In FIG. 1, reference numeral 1 generally designates the electrically powered car, which has a supporting structure generally designated by 2 in FIG. 2. Structure 2 is made of light alloy and comprises (see also FIG. 3) two side structures 3 each formed by extruded profile element 4 connected by welding to connector elements 5 of light alloy which have been obtained by casting. The two side structures 3 are connected to each other by cross members 6, 7, 8, 9 which also are formed by extruded profile elements of light alloy, which have their ends connected to the side structures 3 by mechanical coupling means, such as screws, and if necessary also by adhesive. As shown in FIGS. 2, 3, the reticular framework 2 is formed by a reduced number of parts and does not include elements which extend rearwardly of the rear beams of the side doors and rearwardly of the cross member 6 which connects the lower ends of these beams. This cross member is also used, as will be described hereinafter, has a supporting element for a sub-assembly which includes the power unit and the rear suspension of the motor-vehicle.

Figure 6:
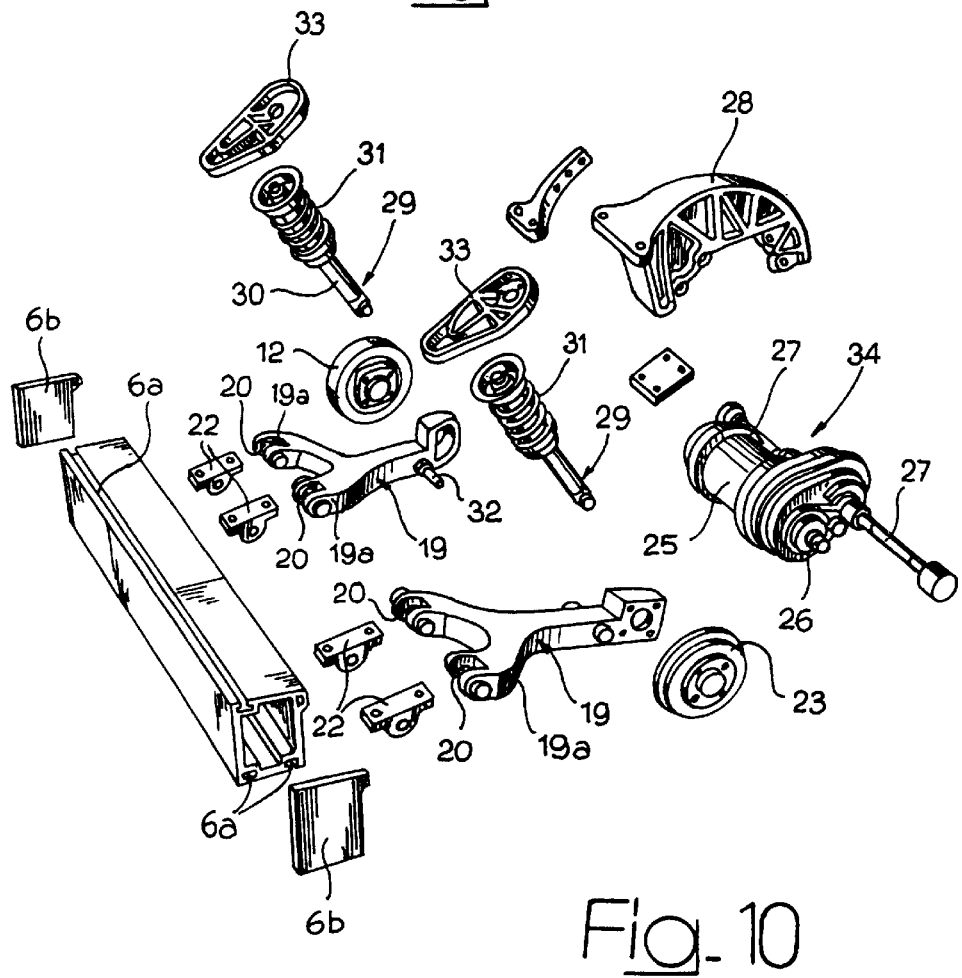
FIG. 6 is perspective exploded view of the unit shown in FIG. 5.

As also shown in FIGS. 2, 3, the reticular structure 2 is connected by mechanical coupling means (screws or rivets) and adhesive to a floor panel 10, preferably made of composite material, including a central longitudinal tunnel-like portion 11 which is used to receive thereunder electric batteries 12 carried by a tray-shaped element 13, these batteries serving for supplying the electric motor with which the motor-vehicle is provided. The floor panel of composite material is preferably made embedding therein the electric wires forming part of the electric system, as also shown hereinafter. Furthermore, said central longitudinal tunnel-like portion 11 may be used also as a supporting element for further components, such as particularly the guides of the front seats, which are supported in a cantilever fashion by said central longitudinal tunnel-like portion so as to leave the space under each seat easily accessible also laterally from outside, as also will be described hereinafter.

The body of the motor-vehicle comprises panels of composite material 14, some of which are shown in the drawings, which are connected by mechanical coupling means (screws or rivets) and/or adhesive to the reticular structure 2.

FIG. 4 shows the structure of a side door of the motor-vehicle which also includes a frame of light alloy 15 formed by extruded and bent profile elements made of light alloy and an outer panel 16 and inner panel 17 of composite material which are connected, e.g. by screws and/or adhesive, to frame 15. Frame 15 may be used to support the weather strips guiding the window pane, the sealing strips, the conventional anti-intrusion bar and the door lock and the door hinges. The inner panel 17 of polymeric composite material is adapted to support the mechanisms for driving the pane and opening the door, as well as the inner upholstery. This configuration has relevant advantages with respect to reduced weight, reduced number of components, low cost of production, easy integration of the accessories within the components of composite material, and easy manufacture of the outer and inner shapes even if very complicated. The use of panels of plastic material, finally, eliminates the corrosion problems.

With reference to FIGS. 5–7, cross member 6 is used for supporting a preassembled power and rear suspension unit of the motor-vehicle. The supporting cross member 6 has slots 6a with a T-shaped cross section which receive the heads of screws for fixing the ends of the cross member 6 to the supporting structure 2, as well as for fixing of the further components of the power and rear suspension unit, which is generally designated by reference numeral 18. Cross member 6 is further provided with two end covering plates 6b (FIG. 6). The unit 18 further includes two longitudinal arms 19, forming part of the rear suspension of the motor-vehicle, each having at one end two legs 19a each ending with a fork 20 for articulation of the supporting cross member 6 around a common articulation axis 21 (FIG. 5) parallel to the longitudinal direction of cross member 6, i.e. transverse relative to the longitudinal direction of the motor-vehicle. Forks 20 are articulated to cross member 6 by articulation supports 22 which are screwed to the cross member 6.

Arms 19 have free ends which rotatably support respective wheel supports 23.

Reference numeral 24 generally designates the power unit which, in the illustrated example, comprises an electric motor 25 and a reducing gear unit 26 from which two axle shafts 27 project which are connected by conventional universal joints to the wheel supports 23 so as to transmit the torque generated by the power unit 24 to the wheels. This unit is fixed to a supporting beam 28 which on its turn is screwed to the supporting cross member 6, so that the power unit 24 is supported in a cantilever fashion by cross member 6, rearwardly of the latter, with reference to the direction of movement of the motor-vehicle, indicated by arrow A in FIG. 5. The rear suspension further includes two suspension members 29 each comprising a damping cylinder 30 and a helical spring 31. Each of these members is interposed between a support 32 carried by the respective arm 19 and a support 33 screwed to the supporting beam 6.

As it is clearly apparent from the foregoing description, the whole unit 18 can be preassembled and then mounted with a single operation onto the supporting structure of the motor-vehicle, in a simple and rapid way. Similarly, it can be dismantled to allow maintenance or registering operations.

Naturally, the use of a modular unit of the type described above also enables the production to be rationalized, for example by adopting the same module for vehicles of different size. As already indicated, the only connection of the unit to the supporting structure of the vehicle is represented by the mechanical coupling means at the ends of the supporting cross member 6, which renders the assembling and dismantling operations extremely simple and rapid. Although, as already indicated, the invention is applicable to any type of motor-vehicle, its application to the car which has been described in the foregoing gives raise to further advantages, due to the extremely simple and hence cheap configuration of the supporting structure of the vehicle.

With reference to FIGS. 8, 9, the floor panel 10 of the motor-vehicle has a sandwich-like structure (FIG. 9) comprising a core 34 of foamed plastic material, preferably polyurethane material, coated on its two opposite sides with a preformed layer 35 of fibre glass. To obtain this sandwich-like structure, there is provided a mould having a configuration corresponding to the floor panel to be obtained on which a first preformed layer 35 is deposited, followed by the preformed polyurethane foam 34 and the second layer 35. The mould is closed and a thermosetting polyester resin is injected, such as resin "Aropol 7343" by Ashland Chemical Inc. Inside the mould metal inserts 13 are provided each comprising a tubular cylindrical body 37 whose axis 38 is orthogonal the plane of the floor panel and extends throughout the whole thickness of the floor panel, with two end disks 39, 40. The tubular body 37 has a cylindrical hole for engagement of screws for fixing further elements (not shown) to the floor panel.

According to the invention, during the manufacturing process of the floor panel, inside the mould there are also provided the electric wires which are to connect the electric supply batteries to the electric motor of the car, as well as the various control devices with which the car is provided. This electric wires, designated in FIG. 8 by reference numeral 42, preferably have no insulating sheath, since this function is fulfilled by the structure itself of the floor panel. As shown in FIG. 2, the terminals of the various electric wires project out of the floor panel, to be connected to respective connectors. However, it is naturally possible that also these connectors, to which the terminals of electric wires 42 are connected, be embedded within the floor panel.

Figure 10:
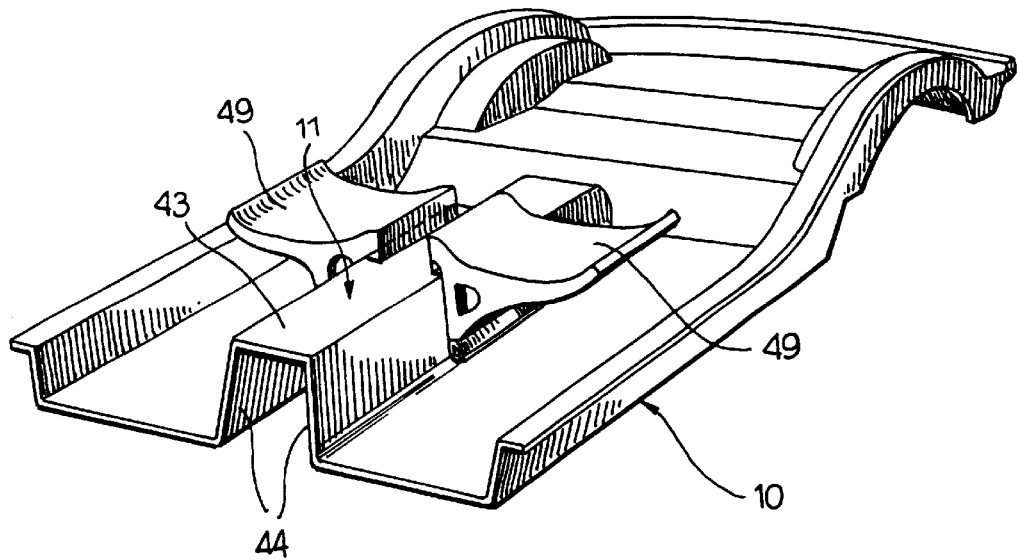
FIG. 10 is a diagrammatic perspective view of the floor panel of the motor-vehicle, with a part of the device for guiding and supporting the seats mounted thereon.

With reference to FIGS. 10–12, the floor panel 10 of the motor-vehicle has a central longitudinal tunnel-like portion 11 comprising a substantially horizontal upper wall 43 and two substantially vertical side walls 44.

The embodiment which is illustrated herein refers to a car with only two side doors, having two front seats 45, 47 and two rear seats 48. Each of the two front seats 45, 47 is mounted on an auxiliary supporting structure 49, preferably made of magnesium alloy, which is supported in a cantilever fashion by the respective side wall 44 of the longitudinal central tunnel-like portion 11 of the floor panel 10 of the motor-vehicle. On each side wall 44 there are fixed two guide rails 50, 51 (FIG. 12) arranged along two longitudinal parallel directions which are spaced apart from each other vertically. On these guide rails 50, 51 there are slidably mounted cooperating guide skids which are associated with the auxiliary supporting structure 49, so as to render the position of the seat with respect to the floor panel 10 of the motor-vehicle adjustable along the longitudinal direction of the motor-vehicle.

The details of construction of the guide rails 50, 51 and the respective skids are not shown herein, since these details may be made in any known way and do not fall, taken alone, within the scope of the present invention. The same applies to the device for locking the seat in the selected longitudinal position, which also can be provided in any known way. Also in this case, therefore, these details have not been shown, since they do not fall within the scope of the invention and their deletion from the drawings renders the latter easier to understand. As it is clearly apparent from FIGS. 10, 12, due to the above described arrangement, the space under the seat is completely free both for placing objects in it and for inserting the feet by the passengers seated on the rear seat. When the front seats are in their forward most position with the backrest tilted forwardly, to enable the passengers to get on and off the rear seats, the floor panel does not present any obstacle to the passengers. Furthermore, the portion of the floor panel under the seat is completely relieved from loads and stresses. Finally, since the auxiliary supporting structure 7 is mounted in a cantilever fashion on tunnel 3, the space under the seat is completely opened on its side facing outwardly of the motor-vehicle so as to be easily accessible also laterally.

According to further preferred (although not essential) features, the seat 45 has its frame mounted on the auxiliary supporting structure 49 so as to be rotatable around a vertical axis 46, to allow a 90° rotation of the seat outwardly of the motor-vehicle so as to make easier for the passenger to get on and off. In a possible variant, the seat frame is further mounted on the auxiliary supporting structure 49 with the interposition of guide means which allow the seat to be displaced laterally outwardly to make further easy for the passenger to get on and off the seat.

As it is clearly apparent from the foregoing description, the device according to the invention for supporting and guiding the front seats can be provided in a simple and inexpensive way, is reliable in operation and solves efficiently all the drawbacks of the prior art which have been described.

Naturally, while the principle of the invention remains the same, the details of construction and the embodiments may widely vary with respect to what has been described and illustrated purely by way of example, without departing from the scope of the present invention.

What is claimed is:

1. Motor-vehicle, comprising:
   a supporting structure formed by a reticular framework (2) of light alloy,
   said reticular framework (2) including two side structures (3) each formed by extruded profile elements (4) welded to cast connector elements (5),
   said side structures (3) being connected to each other by cross members (6, 7, 8, 9) which are also formed by extruded profile elements having their ends connected to said side structures (3) by mechanical coupling means,
   wherein said motor-vehicle has an electric power unit and said reticular framework (2) is connected to a floor panel of composite plastic material (10) including a longitudinal central tunnel-shaped portion (11), said tunnel-shaped portion (11) housing hereunder electric batteries (12) for supplying the electric power mit of the motor-vehicle, and
   wherein said electric power unit forms part of a preassembled power and suspension unit (18) including:
   a supporting cross member (6), formed by an extruded metal profile fixed by mechanical coupling means to the supporting structure (2) of the motor-vehicle,
   a pair of longitudinal arms (19) pivotally connected to the cross member (6) around a common axis (21) parallel to a longitudinal direction of said supporting cross member (6), said arms (19) having free ends on which there are rotatably mounted respective wheel supports (23),
   said electric power unit (24) supported in a cantilever fashion by the supporting cross member (6) by a supporting beam (28) fixed to the supporting cross member (6) and including two axle shafts (27) connected to said wheel supports (23) to transfer thereto torque generated by the electric power unit (24), and
   a pair of suspension members (29) comprising a damping cylinder (30) and a helical spring (31) respectively interposed between the two longitudinal arms (19) and two respective supports (33) fixed to the supporting cross member (6).

2. Motor-vehicle according to claim 1, characterized in that the electric power unit (24) is formed by an electric motor (25) and a gear reducing unit (26).

3. Motor-vehicle according to claim 1, characterized in that the supports (22) to which the longitudinal arms (19) are articulated, the beam (28) supporting the electric power unit (24) and the supports (33) for the suspension members (29) are all fixed to the supporting cross member (6) by screws.

4. Motor-vehicle according to claim 1, characterized in that the supporting cross member (6) is fixed at its ends to the supporting structure (2) of the motor-vehicle by screws.

5. Motor-vehicle according to claim 1, characterized in that the supporting cross member (6) is an extruded profile of aluminium alloy.

6. Motor-vehicle according to claim 1, characterized in that the supporting cross member (6) supporting the preassembled unit (18) connects said two side frame structures (3) forming part of the vehicle supporting structure (2) at lower rear connector elements thereof.

7. Motor-vehicle according to claim 1, characterized in that said floor of composite plastic material (10) has a plurality of electric wires (42) embedded therein, said electric wires (42) having no insulating sheath and having terminals connected to electric connectors which are also embedded within the structure of the floor panel (10) and project at least partially from the surface of the floor panel.

8. Motor-vehicle according to claim 7, characterized in that in said floor panel (10) there are embedded metal inserts (36) each having an axial hole (41) extending throughout the whole thickness of the panel, for engagement of screws for fixing further elements to the floor panel (10).

9. Motor-vehicle according to claim 1, wherein a substantially vertical side wall (44) of said longitudinal tunnel-shaped portion (11) has guide rails (50, 51) directed along two parallel longitudinal directions which are vertically spaced apart from each other, and a seat frame is supported in a cantilever fashion by said vertical wall (44) through an auxiliary supporting structure (49) which is slidably mounted on said rails (50,51).

10. Motor-vehicle according to claim 9, characterized in that the seat frame is mounted on said auxiliary supporting structure (49) with the interposition of further guide means which enable the seat (45) to be displaced laterally outwardly of the motor-vehicle, to make it easier for a passenger getting on and off the seat.

11. Motor-vehicle according to claim 1, characterized in that it has a body comprising panels of composite plastic material (14) connected to said reticular structure (2).

* * * * *